2 Sheets—Sheet 2.

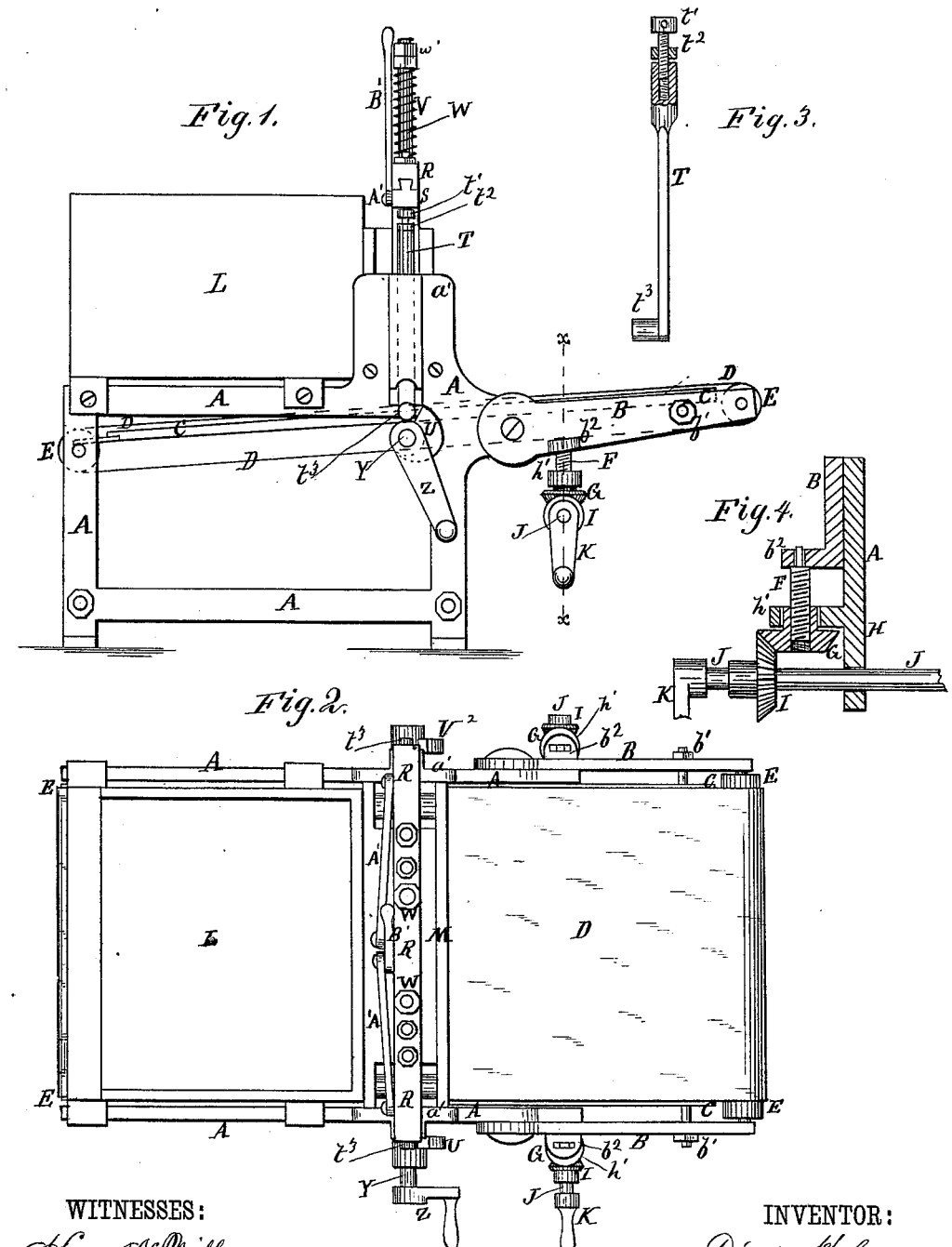

D. M. HOLMES.
Cake-Machine.

No. 220,380. Patented Oct. 7, 1879.

WITNESSES:
Henry N. Miller
C. Sedgwick

INVENTOR:
D. M. Holmes
BY Munn & Co
ATTORNEYS.

UNITED STATES PATENT OFFICE.

DANIEL M. HOLMES, OF ARLINGTON, NEW JERSEY, ASSIGNOR TO LYDIA A. McCOLLUM, OF NEW YORK, N. Y., EXECUTRIX OF THE ESTATE OF JOHN McCOLLUM.

IMPROVEMENT IN CAKE-MACHINES.

Specification forming part of Letters Patent No. 220,380, dated October 7, 1879; application filed March 25, 1879.

*To all whom it may concern:*

Be it known that I, DANIEL M. HOLMES, of Arlington, in the county of Hudson and State of New Jersey, have invented a new and useful Improvement in Cake-Machines, of which the following is a specification.

Figure 5:
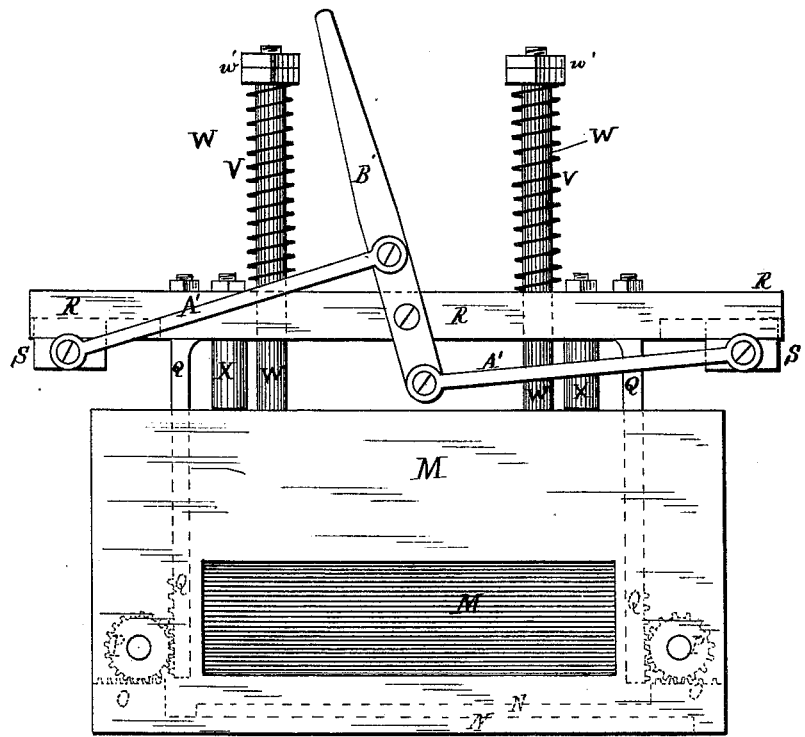
Figure 6:
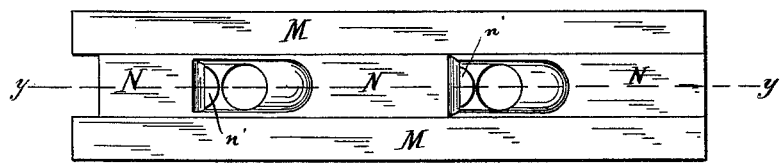
Figure 7:
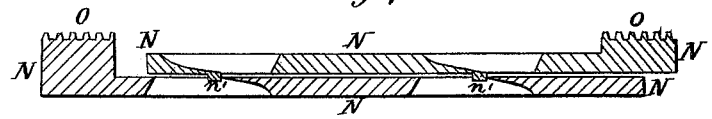

Figure 1, Sheet 1, is a side view of a part of a cake-machine to which my improvement has been applied. Fig. 2, Sheet 1, is a top view of the same. Fig. 3, Sheet 1, is a detail view of one of the lifting-rods, partly in section to show the construction. Fig. 4, Sheet 1, is a detail sectional view taken through the line $x$ $x$, Fig. 1. Fig. 5, Sheet 2, is a rear view of the discharge-compartment of the dough-box. Fig. 6, Sheet 2, is a bottom view of the same. Fig. 7, Sheet 2, is a detail section taken through the line $y$ $y$, Fig. 6.

Similar letters of reference indicate corresponding parts.

The object of this invention is to improve the construction of the cake-machines for which Letters Patent Nos. 174,244 and 188,366 were granted February 29, 1876, and March 13, 1877, respectively, Daniel M. Holmes, inventor, so as to make them more convenient in use and more reliable and effective in operation.

The invention consists in the combination of the hinged arms, the screws, the swiveled nuts and gear-wheels, the gear-wheels, and the crank-shaft with the floor and endless belt of the carrier; in the two slides, placed one above the other, each provided with short slots or oblong holes, having curved and straight ends, partially overlapping each other, the said slots being cut, respectively, on the upper and lower sides of the said slides, which are arranged to move in opposite directions, in combination with the slotted bottom of the discharge-compartment of the dough-box of a cake-machine; in the combination of the sliding cutters of a cake-machine provided with oblong holes concaved around the curved ends, and the semicircular projections; in the combination of the rack-teeth, the gear-wheels, and the rack-bars with the sliding cutters, the cross-bar, the push-rods, the cams, and the driving-shaft; and in the combination of the sliding blocks with the cross-bar and the push-rods, for throwing the sliding cutters into and out of gear with the driving-shaft, as hereinafter fully described.

A represents the frame of the machine, to the forward end of which are hinged two arms, B. The arms B are connected near their forward ends by a cross-rod, $b^1$, upon which rests the forward part of the floor C of the endless belt D of the carrier. The carrier-belt D passes around rollers E, pivoted to the rear part of the frame A and to the forward ends of the arms B, and is driven by power applied to the journal of one of the said rollers.

To the lower parts of the arms B, near their inner ends, are attached, or upon them are formed, lugs $b^2$, which have short slots formed in them to receive the flattened upper ends of the screws F. The screws F pass through screw-holes in the hubs of the small bevel-gear wheels G, which are swiveled to lugs $h'$, formed upon the outer sides of the hangers H, formed upon or attached to the forward ends of the side bars of the frame A.

Into the teeth of the gear-wheels G mesh the teeth of the small bevel-gear wheels I, attached to the shaft J, which revolves in bearings in the lower ends of the hangers H, and has a crank, K, attached to one of its ends, for convenience in operating it.

With this construction, by turning the crank K, the outer ends of the arms B may be raised and lowered to bring the carrier-belt D closer to and farther from the outlet-openings of the discharge-compartment of the dough-box.

L is the dough-box, which is attached to the rear part of the frame A, and in its forward end is formed an opening, which opens into the discharge-compartment M. The compartment M is secured at its ends to brackets $a'$, formed upon the forward part of the frame A. In the bottom of the compartment M is formed a longitudinal slot, in which works two slides, N, the one directly above the other, and in which are formed two or more short slots or oblong holes having curved and straight ends, the holes of the two slides partially overlapping each other, the said slots being cut, respectively, on the upper and lower sides of the said slides, which are arranged to move in opposite directions, so that when the two slides are drawn outward a circular hole may be formed for the escape of the dough.

The lower side of the lower slide N and the upper side of the upper slide N around their holes are concaved, so that the outer parts of the said slides around the said holes may be nearly flat, and the edges around the said holes very thin, so as, when the said slides are faced together, they may cut off the dough smoothly, and so that the dough may not come in contact with and adhere to the said slides. The edges of the slides N at the straight ends of their holes are beveled upon the outer sides, so as to act as scrapers to scrape off the dough and keep it from working in between the said slides.

Upon the lower side of the upper slide N, at the rear of the curved end of its hole, is formed a semicircular projection, $n'$, with its curved edge forward, so as to meet and fit against the curved edge of the hole in the lower slide, and thus pinch off the thread of dough left uncut by the edges of the cutters, thus making a clean cut.

Upon the upper sides of the outer ends of the slides N are formed rack-teeth O, into which mesh the teeth of the small gear-wheels P, pivoted to and between the projecting ends of the sides of the compartment M. The teeth of the gear-wheels P also mesh into the teeth of the upright rack-bars Q, which slide in grooves in the outer sides of the ends of the compartment M, and their upper ends are secured to a cross-bar, R. The ends of the cross-bar R project, and have dovetailed grooves formed in their lower sides to receive the dovetailed upper sides of the sliding blocks S, the lower sides of which rest upon the heads of the screws $t^1$, which are screwed into screw-holes in the upper ends of the push-rods T, where they are locked in place when adjusted by the jaw-nuts $t^2$, screwed upon the said screws $t^1$.

The push-rods T slide up and down in keepers attached to the outer sides of the lugs or brackets $a'$, and to the outer sides of their lower ends are attached pins $t^3$, provided with friction-rollers for the cams U to operate upon to raise the said push-bars, to draw back the sliding cutters N and allow the dough to be forced out. When the push-bars T are released from the cams U the sliding cutters N are forced inward to cut off the dough by the spiral springs V, placed upon the rods W, and the upper ends of which rest against the nuts $w'$, screwed upon the upper ends of the said rods W.

The lower ends of the spiral springs V rest upon the upper side of the cross-bar R. The rods W pass down through the holes in the cross-bar R, and their lower ends are rigidly attached to the top of the compartment M, or to a cross-bar or plate rigidly connected with the said top, so that the springs V may be compressed by the upward movement of the said cross-bar R.

The downward movement of the cross-bar R is limited by the stop-pins X, the upper ends of which are attached to the said cross-bar, and which are made of such a length that their lower ends will strike against the top of the compartment M, or against a cross-bar or plate rigidly connected with the said top, when the said cross-bar R has descended to the required point.

The cams V are attached to the shaft Y, which revolves in bearings attached to the frame A, and to one of its ends is attached a crank, Z, or a pulley to receive a driving-belt.

To one side of the sliding blocks S are pivoted the outer ends of two connecting-bars, A', the inner ends of which are pivoted to the lever B' upon the opposite sides of and equally distant from its pivoting-point. The lever B' is pivoted to the center of one side of the cross-bar R, and its upper end projects into such a position that it may be conveniently reached and operated by the operator.

With this construction, by operating the lever B' the blocks S will be drawn inward, so that they will not be struck by the push-rods T.

When the machine is first started, or when a new charge is put into the dough-box L, the sliding blocks S are drawn inward and the push-bars T are allowed to run idle until the dough has been forced into the compartment M, and has acquired such a pressure as will cause it to pass out of the openings into the sliding cutters promptly. The blocks S are then slid outward, and the sliding cutters N begin to operate.

Various gages may be used to ascertain when the dough in the compartment M has acquired the desired pressure. A simple way to ascertain this is to insert a plug in a hole formed in the side of the compartment M at or near one corner, and which will be forced out when the said compartment is filled and has received the requisite pressure.

Having thus described my invention, what I claim as new, and desire to secure by Letters Patent, is—

1. The combination of the hinged arms B, the screws F, the swiveled nuts and gear-wheels G, the gear-wheels I, and the crank-shaft J K with the frame A, the floor C, and the endless belt D of the carrier, substantially as herein shown and described.

2. The two slides N, placed one above the other, each provided with short slots or oblong holes, having curved and straight ends, and partially overlapping each other, the said slots being cut respectively on the upper and lower sides of the said slides, which are arranged to move in opposite directions, with the slotted bottom of the discharge-compartment of the dough-box of a cake-machine, substantially as herein shown and described.

3. The combination of the sliding cutters N of a cake-machine provided with oblong holes concaved around the curved ends, and the semicircular projections $n'$, substantially as herein shown and described.

4. The combination of the rack-teeth O, the gear-wheels P, and the rack-bars Q with the sliding cutters N, the cross-bar R, the push-rods T, the cams V, and the driving-shaft Y, substantially as herein shown and described.

5. The combination of the sliding blocks S with the cross-bars R and the push-rods T, for throwing the sliding cutters N into and out of gear with the driving-shaft Y, substantially as herein shown and described.

DANIEL M. HOLMES.

Witnesses:
 JAMES T. GRAHAM,
 C. SEDGWICK.